US012785352B2

(12) United States Patent
Fuchs et al.

(10) Patent No.: US 12,785,352 B2
(45) Date of Patent: Nov. 3, 2026

(54) ULTRACOMPACT, ULTRASHORT COHERENT LIGHT SOURCES OPERATING AT UV TO X-RAY WAVELENGTHS

(71) Applicant: NUtech Ventures, Inc., Lincoln, NE (US)

(72) Inventors: Matthias Fuchs, Lincoln, NE (US); Grayson Minnick, Lincoln, NE (US)

(73) Assignee: Board of Regents Of The University Of Nebraska, Lincoln, NE (US)

( * ) Notice: Subject to any disclaimer, the term of this patent is extended or adjusted under 35 U.S.C. 154(b) by 737 days.

(21) Appl. No.: 18/356,756

(22) Filed: Jul. 21, 2023

(65) Prior Publication Data

US 2024/0030675 A1 Jan. 25, 2024

Related U.S. Application Data

(60) Provisional application No. 63/391,091, filed on Jul. 21, 2022.

(51) Int. Cl.

| | |
|---|---|
| ***H01S 4/00*** | (2006.01) |
| ***H01S 3/0959*** | (2006.01) |
| ***H01S 3/10*** | (2006.01) |
| ***H05H 7/04*** | (2006.01) |

(52) U.S. Cl.

CPC .............. *H01S 4/00* (2013.01); *H01S 3/0959* (2013.01); *H01S 3/10061* (2013.01); *H05H 7/04* (2013.01); *H05H 2007/041* (2013.01)

(58) Field of Classification Search

CPC ...... H05H 2007/041; H05H 7/04; H01S 4/00; H01S 3/0903

See application file for complete search history.

(56) References Cited

U.S. PATENT DOCUMENTS

| | | | |
|---|---|---|---|
| 8,787,529 | B2 | 7/2014 | Graves et al. |
| 9,548,584 | B2 | 1/2017 | Almasi et al. |
| 9,819,137 | B2 | 11/2017 | Musumeci et al. |

(Continued)

OTHER PUBLICATIONS

Yu, "Generation of intense UV radiation by subharmonically seeded single-pass free-electron lasers," Phys. Rev. A 44, 5178, published 1991. (Year: 1991).*

(Continued)

*Primary Examiner* — Yuqing Xiao

*Assistant Examiner* — Zhengqing Qi

(74) *Attorney, Agent, or Firm* — Gerald T. Gray; Leydig, Voit & Mayer, LTD.

(57) ABSTRACT

Systems and methods for generating longitudinally modulated (micro-bunched) electron bunches and for generating coherent radiation by the emission from relativistic electrons with a density that is longitudinally modulated (micro-bunched) with a spatial dimension that is significantly below the wavelength of the emitted radiation. The light source includes a high-brightness relativistic electron beam that interacts in a magnetic structure (linear or helical undulator or wiggler) or an electromagnetic structure with a pulse of high-power electro-magnetic wave (modulation laser pulse). The interaction leads to a large energy-modulation of the electron bunch which is transformed into a spatial modulation by an energy-dispersive element that can be the same undulator.

16 Claims, 3 Drawing Sheets

Schematic of an embodiment of a coherent light source device.

(56) References Cited

U.S. PATENT DOCUMENTS

| | | | | |
|---|---|---|---|---|
| 10,381,796 | B2 | 8/2019 | Smorenburg et al. | |
| 11,000,245 | B2 | 5/2021 | Fuchs et al. | |
| 2007/0152171 | A1* | 7/2007 | Goldstein | G03F 7/70025 250/492.3 |
| 2016/0014874 | A1 | 1/2016 | Kaganovich et al. | |

OTHER PUBLICATIONS

Liu et al., "Experimental Observation of Femtosecond Electron Beam Microbunching by Inverse Free-Electron-Laser Acceleration," Physical Review Letters 80(20):4418-4421, May 1998. (Year: 1998).*

Curbis, Freund & De Ninno, "Coherent Harmonic Emission of the Elettra Storage-Ring Free-Electron Laser in Single-Pass Configuration," Proceedings of FEL 2006. (Year: 2006).*

Sears, "Production, Characterization, and Acceleration of Optical Microbunches," SLAC-R-902 / Stanford dissertation, 2008. (Year: 2008).*

Labat et al., "High-Gain Harmonic-Generation Free-Electron Laser Seeded by Harmonics Generated in Gas," Phys. Rev. Lett. 107, 224801, published 2011. (Year: 2011).*

Chen et al., "Coherent Thomson Scattering Radiation Generated by using PEHG," 6th International Particle Accelerator Conference (IPAC), published 2015. (Year: 2015).*

Tochitsky et al., "Efficient harmonic microbunching in a 7th-order inverse-free-electron laser interaction," Phys. Rev. ST Accel. Beams 12, 050703, Published May 14, 2009 (Year: 2009).*

Y. Lui et al., "Experimental Observation of Femtosecond Electron Beam Microbunching by Inverse Free-Electron-Laser Acceleration" (1998).

Geloni Gianluca et al., "A Novel Self-Seeding Scheme for Hard X-ray FELs" (2011).

L. H. Yu, "Generation of Intense UV Radiation Subharmonically Seeded Single-Pass Free-Electron Lasers" (1991).

B. Girarg et al., "Optical Frequency Multiplication by an Optical Klystron" (1984).

K. Ta Phuoc et al., "Betatron radiation from density tailored plasmas," Physics of Plasmas 15, 063102 (2008) Jun. 9, 2008.

Corde et al., "Femtosecond x rays from laser-plasma accelerators," Reviews of Modern Physics, vol. 85, No. 1, Jan.-Mar. 2013, published Jan. 9, 2013.

Albert et al., "Observation of Betatron X-Ray Radiation in a Self-Modulated Laser Wakefield Accelerator Driven with Picosecond Laser Pulses," PRL 118, 134801 (2017), published Mar. 31, 2017.

Kostyukov et al., "Phenomenological theory of laser-plasma interaction in "bubble" regime," Physics of Plasmas 11, 5256 (2004); https://doi.org/10.1063/1.1799371, published Oct. 22, 2004.

Cipiccia et al., "Gamma-rays from harmonically resonant betatron oscillations in a plasma wake," Nature Physics, vol. 7, Macmillan Publishers Limited, DOI: 10.1038/NPHYS2090, published Sep. 18, 2011.

Oz et al., "Ionization-Induced Electron Trapping in Ultrarelativistic Plasma Wakes," Physical Review Letters 98, 084801 (2007), published Feb. 23, 2007.

Esarey et al., "Synchrotron radiation from electron beams in plasma-focusing channels," Physical Review E, vol. 65, 056505, published May 20, 2002.

Chen et al., "Bright betatron X-ray radiation from a laser-driven-clustering gas target," Scientific Reports, 3:1912, DOI:10.1038/srep01912, published May 29, 2013.

Geddes et al., "Plasma-Density-Gradient Injection of Low Absolute-Momentum-Spread Electron Bunches," PRL 100, 215004 (2008), published May 30, 2008.

Popp et al., "All-Optical Steering of Laser-Wakefield-Accelerated Electron Beams," PRL 105, 215001 (2010), published Nov. 16, 2010.

Rowlands-Rees et al., "Laser-Driven Acceleration of Electrons in a Partially Ionized Plasma Channel," PRL 100, 105005 (2008), published Mar. 14, 2008.

Pukhov et al., "Laser wake field acceleration: the highly non-linear broken-wave regime," Appl. Phys. B 74, 355-361 (2002), published Mar. 14, 2002.

Esarey et al., "Physics of laser-driven plasma-based electron accelerators," Reviews of Modern Physics, vol. 81, Jul.-Sep. 2009, published Aug. 27, 2009.

Faure et al., "Controlled injection and acceleration of electrons in plasma wakefields by colliding laser pulses," Nature Letters, vol. 444, doi:10.1038/nature05393, Nature Publishing Group, Dec. 7, 2006.

Rosenzweig et al., "Acceleration and focusing of electrons in two-dimensional nonlinear plasma wake fields," Physical Review A, vol. 44, No. 10, Nov. 15, 1991.

* cited by examiner

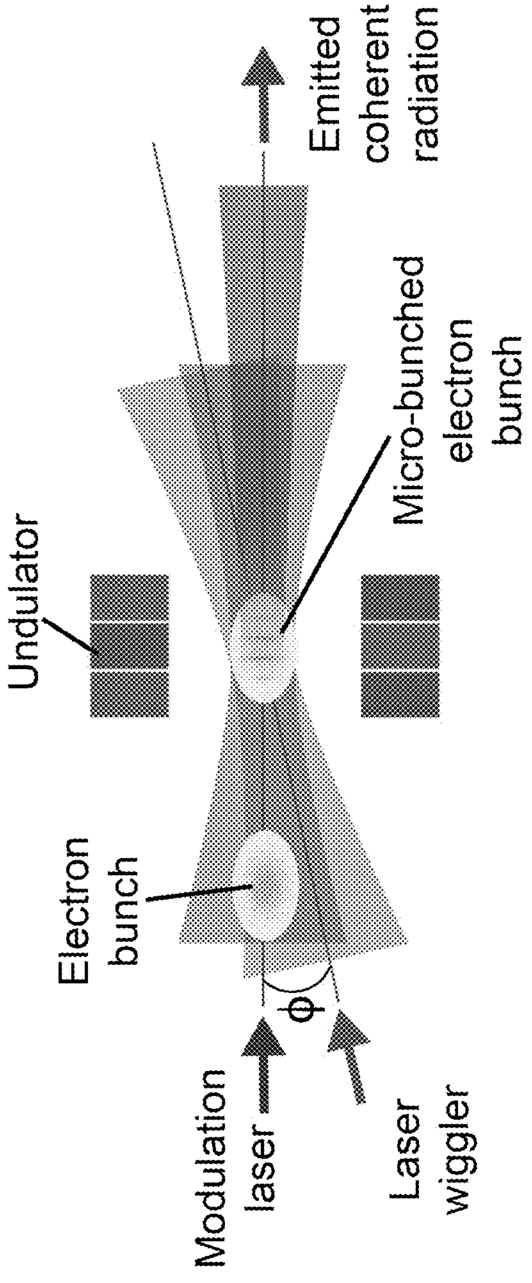
FIG. 1: Schematic of an embodiment of a coherent light source device.

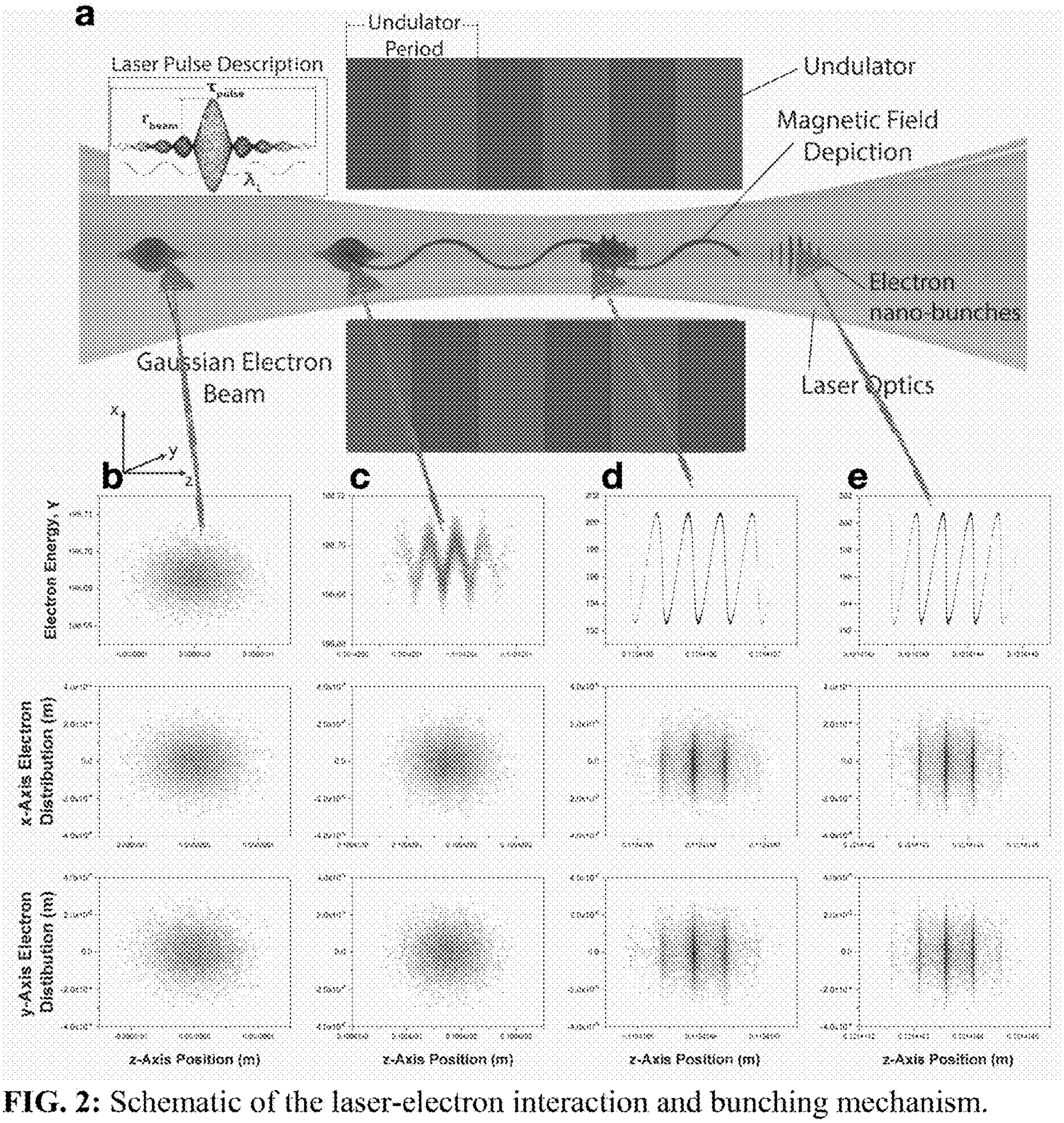
FIG. 2: Schematic of the laser-electron interaction and bunching mechanism.

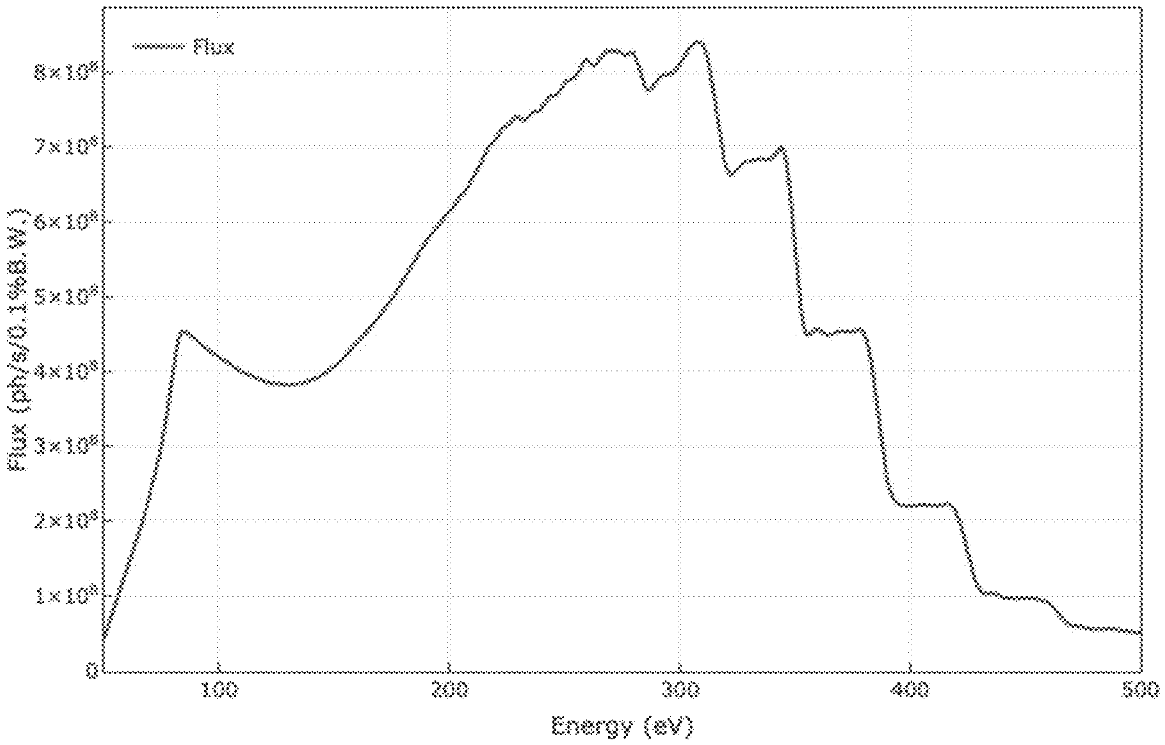
FIG. 3: Simulated spectrum of coherent radiation emission of one microbunch.

ULTRACOMPACT, ULTRASHORT COHERENT LIGHT SOURCES OPERATING AT UV TO X-RAY WAVELENGTHS

CROSS-REFERENCE TO RELATED APPLICATIONS

This patent application claims the benefit of U.S. Provisional Patent Application No. 63/391,091, filed Jul. 21, 2022, which is incorporated by reference in its entirety for all purposes.

FIELD AND SUMMARY

The present disclosure provides systems and methods for producing coherent light operating from UV to hard X-ray wavelengths with high average power.

The embodiments described herein provide light sources that enable the generation of ultrashort, high-brilliance, short-wavelength radiation pulses with a high average power from a compact setup. The photon energy of the emitted radiation can range from ultraviolet (UV) to hard X-ray wavelengths, including extreme ultraviolet (EUV) and soft X-ray wavelengths. According to an embodiment, a light source device generates pulses of coherent radiation with an ultrahigh peak brilliance, and with a high average power that ranges from a few Watts to more than tens of kiloWatts. The dimensions of the light source device are ultra-compact ranging from sub-meter to a few tens of meters. The duration of the light pulses is extremely short ranging from sub-attosecond (1 as=$10^{-18}$ s) to picoseconds (1 ps=$10^{-12}$ s) or longer. It should be appreciated that "light source" and "light source device" may be used interchangeably herein.

According to certain embodiments, coherent radiation is generated by the emission from relativistic electrons with a density that is longitudinally modulated (micro-bunched) with a spatial dimension that is significantly below the wavelength of the emitted radiation. The light source includes a high-brightness relativistic electron beam that interacts in a magnetic structure (linear or helical undulator or wiggler) or an electromagnetic structure with a pulse of high-power electro-magnetic wave (modulation laser pulse). The interaction leads to a large energy-modulation of the electron bunch which is transformed into a spatial modulation by an energy-dispersive element that can be the same undulator.

In an embodiment, coherent emission with a wavelength that is significantly shorter (by approximately a factor of 100 or more) than that of the incoming high-power modulation laser pulse is generated. The generated radiation has an ultra-high peak brilliance. The source can be operated at high repetition rates with currently available technologies, resulting in a light source with high average brilliance and power.

The wavelength of the incoming laser pulse can range from sub-THz to X-ray wavelengths, including infrared, optical and UV wavelengths. The interaction of the modulation light pulse with the electron bunch inside the undulator leads to a strong periodic energy-modulation of the electron beam energy (see FIG. 1 and FIG. 2). This energy modulation is converted into a spatial density modulation (microbunches) through an energy-dispersive element, which can include the (electro-) magnetic structure used to induce the energy modulation described above or can be an external component.

Certain embodiments are based on the largest energy modulation of the electron bunch possible (a few tens percent), such that microbunches with very short duration that are ultimately limited by repelling space-charge forces between the electrons are generated.

In certain embodiments the radiation is generated while the microbunching occurs inside the undulator where the space charge repulsion is suppressed compared to a free drifting electron bunch. The electromagnetic field pulses can be generated by fresh laser pulses for each repetition or can be provided through recycling the previous laser pulse in a laser cavity that can be an enhancement cavity.

Advantages of the present embodiments compared to currently existing technology include that electron bunches with a much lower beam energy than other electron-beam based approaches, such as free-electron lasers (FELs) can be used to generate coherent short wavelength radiation and that the spatial dimensions of the present embodiments are significantly more compact.

The radiation is generated through coherent superradiant emission from the micro-bunched electron bunch at a wavelength longer than the dimension of the microbunches. This includes emission of spontaneous superradiance, including but not limited to coherent transition radiation (CTR), edge radiation or diffraction radiation or stimulated superradiant emission, including but not limited to coherent inverse Compton radiation, coherent Thomson scattering, coherent synchrotron radiation or coherent undulator radiation.

In an embodiment, the light source can be cascaded to generate shorter wavelength radiation. In an example the radiation generated in a first stage can be used as short-wavelength radiation input into a second stage to generate pulses with even shorter wavelength, either from the same spatially- and energy-modulated electron bunch or a fresh (unmodulated) bunch. Multiple cascades can be used.

According to an embodiment, a coherent light source device is provided that comprises a magnetic or an electromagnetic undulator structure configured to produce a linearly or helically polarized magnetic or an electromagnetic field having three or more alternating electromagnetic periods and defining an axis within an interaction region; a modulation laser source configured to emit one or multiple pulses of linearly or circularly polarized electromagnetic radiation that co-propagate with an electron beam bunch along the axis of the magnetic or electromagnetic undulator within the magnetic or electromagnetic undulator; an electron beam source configured to generate the electron beam bunch that traverses the interaction region of the magnetic or electromagnetic undulator along the axis, wherein interaction of the electron beam bunch with the electromagnetic field of the one or multiple pulses of the modulation laser source in the interaction region of the magnetic or electromagnetic undulator structure induces the formation of electron microbunches within the electron beam bunch; and an undulation laser source configured to emit one or multiple pulses of electromagnetic undulation radiation that traverse the interaction region of the electromagnetic undulator at an interaction angle with respect to the axis, or a second magnetic undulator, or a dielectric discontinuity, wherein interaction of the one or multiple pulses of electromagnetic undulation radiation or the second magnetic undulator or the dielectric discontinuity with the electron microbunches induces spontaneous or stimulated coherent emission of radiation by the electron microbunches at an emission wavelength, wherein the emission wavelength is shorter than a wavelength of the one or more or multiple pulses of electromagnetic undulation radiation or is shorter than the period of the second magnetic undulator or is shorter than the thickness of the dielectric discontinuity.

According to an embodiment, the electron microbunches include electron bunches having a longitudinal charge distribution with periodic density spikes that are separated by a distance equal to the wavelength or harmonics of the wavelength of the one or multiple pulses of electromagnetic radiation emitted by the modulation laser source.

According to an embodiment, the one or multiple pulses of electromagnetic radiation are circularly polarized or polarized in a plane of electron deflection of electrons in the electron beam bunch within the interaction region.

According to an embodiment, a method of generating coherent light is provided. The method typically includes generating an electron beam bunch that traverses an axis in an interaction region of a magnetic or an electromagnetic undulator that produces a magnetic or electromagnetic field having three or more alternating electromagnetic periods along the axis within the interaction region, wherein interaction of the electron beam bunch with an additional electromagnetic field induces the formation of electron microbunches within the electron beam bunch; generating one or multiple pulses of electromagnetic radiation that co-propagate with the electron beam bunch along the axis of the electromagnetic undulator within the magnetic or electromagnetic undulator; and generating one or multiple pulses of electromagnetic undulation radiation that traverse the interaction region of the magnetic or electromagnetic undulator at a first interaction angle with respect to the axis, wherein interaction of the one or multiple pulses of electromagnetic undulation radiation with the electron microbunches induces stimulated coherent emission of radiation by the electron microbunches at an emission wavelength that is shorter than a wavelength of the one or more or multiple pulses of electromagnetic undulation radiation, or generating a magnetic undulator, wherein interaction of the magnetic undulator with the electron microbunches induces stimulated coherent emission of radiation by the electron microbunches at an emission wavelength that is shorter than the period of the magnetic undulator, or generating a single or periodic dielectric discontinuity, wherein interaction of the electron microbunches with the dielectric discontinuity induces coherent emission of radiation by the electron microbunches at an emission wavelength that is shorter than the width of the periodic structure.

According to an embodiment, the electron microbunches include electron bunches having a longitudinal charge distribution with periodic density spikes that are separated by a distance equal to the wavelength of the one or multiple pulses of electromagnetic radiation.

According to an embodiment, the one or multiple pulses of electromagnetic radiation are circularly polarized or polarized perpendicular to or in a plane of electron deflection of electrons in the electron beam bunch within the interaction region.

According to an embodiment, the method further includes steering or guiding the electron beam bunch to traverse the interaction region of the electromagnetic undulator along the axis.

According to an embodiment, the emission wavelength $\lambda_r$ is given by the equation:

$$\lambda_r = \lambda_{las}\left(\frac{1+\frac{a_l^2}{2}+\gamma^2\theta^2}{2\gamma^2(1-\cos\phi)}\right),$$

where $\lambda_{las}$ is the wavelength of the one or more or multiple pulses of electromagnetic undulation radiation, $a_l$ is the normalized field of the modulation laser source, $\theta$ is the emission angle of the radiation generated by the electron beam bunch, $\phi$ the interaction angle between the electron beam bunch and the electromagnetic undulator radiation, and $\gamma$ is the energy of the electron beam bunch normalized to the electron rest mass $mc^2$.

According to an embodiment, the emission wavelength $\lambda_r$ is given by the equation:

$$\lambda_r = \frac{\lambda_u}{2n\gamma^2}\left(1+\frac{K_x^2}{2}+\frac{K_y^2}{2}+\gamma^2\theta^2\right),$$

where $\lambda_u$ is the undulator period of the magnetic or electromagnetic undulator structure, n the harmonic number, $\gamma$ the electron beam bunch energy normalized to the electron rest mass $mc^2$, $\theta$ the angle of the radiation generated by the electron beam bunch, and $$K_{x,y} = \frac{e\hat{B}_{x,y}\lambda_u}{2\pi mc^2}$$

is a horizontal/vertical undulator deflection parameter with the undulator peak magnetic field $\hat{B}_{x,y}$.

According to an embodiment, the interaction of the one or more pulses of linearly or circularly polarized electromagnetic radiation with the electron beam bunch inside the linearly or helically polarized magnetic or electromagnetic undulator structure leads to a longitudinally modulated or micro bunched density of the electron beam density of the electron bunch with density spikes that have a length significantly below a wavelength of the one or multiple pulses of electromagnetic radiation when the resonance condition given by the equation:

$$\lambda_l = \frac{\lambda_u}{2n\gamma^2}\left(1+\frac{K_x^2}{2}+\frac{K_y^2}{2}+\frac{a_l^2}{2}\gamma^2\theta_x^2+\gamma^2\theta_z^2\right)$$

is fulfilled, where $\lambda_l$ is the wavelength of the modulation laser source, $\lambda_u$ the undulator period of the magnetic or electromagnetic undulator structure, n the harmonic number, $\gamma$ the electron beam bunch energy normalized to the electron rest mass $mc^2$, $\theta_x$ and $\theta_y$ the electron beam bunch divergence in x and y direction, respectively and the horizontal/vertical undulator deflection parameter $K_{x,y}=e\hat{B}_{x,y}\lambda_u/(2\pi mc^2)=0.0934\ \hat{B}_{x,y}[T]\lambda_u$ [mm] with the undulator peak magnetic field $\hat{B}_{x,y}$ and the normalized laser field $a_l=eE_l\lambda_l/(2\pi mc^2)\approx\lambda_l\ [\mu m]\sqrt{I_l[W/cm^2]/1.4\times10^{18}}$.

According to an embodiment, propagation of the electron microbunches through or near a single or periodic dielectric discontinuity leads to the emission of coherent radiation.

According to an embodiment, the electron beam source includes electron optics components configured to steer or guide the electron beam bunch to traverse the interaction region of the electromagnetic undulator along the axis, and wherein the modulation laser source, the undulation radiation source, the second magnetic undulator and the dielectric discontinuity each include optical components configured to condition and/or direct emitted radiation.

According to an embodiment, the one or multiple pulses of electromagnetic radiation have a pulse duration of between 1 fs-100 ps and a wavelength of between 100-3,000 nm and an intensity of 1-1,000 $TW/cm^2$, wherein the one or multiple pulses of electromagnetic undulation radiation have a pulse duration of between 1 fs-100 ps and a wavelength of between 100-3,000 nm and an intensity of $1\times10^{15}$-$1\times10^{20}$ $W/cm^2$, wherein the electron bunch has an energy of between 50-1,000 MeV, wherein the three or more alternating periods of the magnetic or electromagnetic undulator structure have a period of 0.1-50 cm, and wherein the dielectric discontinuity has a thickness of 50 nm-100 μm or a periodic discontinuity with a period of 1-500 μm.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

FIG. 1 is a schematic of an embodiment of a coherent light source device. The interaction of an electromagnetic wave (modulation laser, blue) with an electron bunch (yellow) in an (electro-) magnetic structure (undulator) causes an energy-modulation of the electron bunch and a modulation of the longitudinal density into spikes (microbunches). A second laser (laser wiggler) is overlapped with the microbunched electron bunch to cause emission of coherent short-wavelength radiation (purple). in accordance with an embodiment.

FIG. 2 is a schematic of the laser-electron interaction and bunching mechanism. Top row: a high-power light pulse interacts with a relativistic electron bunch in a (electro-) magnetic structure. This interaction leads to a strong energy-modulation of the electron bunch and a strong modulation in the spatial electron density. The second row shows the longitudinal electron momentum at the positions along the apparatus indicated by the blue arrows. Rows 2 and 3 show the spatial horizontal (x) and vertical (y) electron distribution at the indicated positions along the interaction.

FIG. 3 shows a simulated spectrum of coherent radiation emission of one microbunch, simulated using the SPECTRA simulation using the parameters shown in Table 1.

DETAILED DESCRIPTION

The present embodiments provide systems and methods for producing coherent light operating from UV to hard X-ray wavelengths with high average power, including light sources that enable the generation of ultrashort, high-brilliance, short-wavelength radiation pulses with a high average power from a compact setup. The photon energy of the emitted radiation can range from ultraviolet (UV) to hard X-ray wavelengths, including extreme ultraviolet (EUV) and soft X-ray wavelengths.

Light Source Properties

The light sources of the present embodiments advantageously require lower, and often significantly lower, electron energies than other electron-beam based approaches. This has the advantage of a compact dimension of the light source, a high conversion efficiency, a lower requirement on the power consumption and lower radiation hazard and shielding requirements.

In certain embodiments, the light sources generate coherent emission that is collimated into a cone in the forward direction, which eases the requirements on subsequent collimation/focusing optics.

The light sources can also generate pulses with ultrahigh brilliance. The extremely short duration of the pulses ensures virtually no motion during exposure, which is of interest for example for high-resolution imaging or lithography applications and can be exploited to investigate atomic dynamics on its natural time scale of interest for the scientific community.

Operated at suitably high repetition rates, the light sources can generate a high average power radiation, which is an essential requirement for lithography and fast imaging. The light sources have a high conversion efficiency of the electron beam power to radiation power.

The wavelength of the emitted radiation is tunable from sub UV to beyond hard X-ray photon energies. The high peak brightness of the radiation can be used to drive nonlinear effects at short wavelengths, for example nonlinear soft X-ray lithography.

PRINCIPALS AND EXAMPLE EMBODIMENTS

In this section, physical principles underlying the process and one example implementation are described (a summary of the light source parameters is given in Table 1, below).

Electron Beam Modulation

The technology described here is based on the interaction of a relativistic electron bunch with a co-propagating linearly or circularly polarized electromagnetic wave (modulation laser pulse) inside a linearly or helically polarized magnetic (or electromagnetic) structure called an undulator or wiggler (see FIG. 1 and FIG. 2). In certain aspects, the undulator or wiggler is not tapered. In an embodiment, using a linear permanent-magnet undulator with a magnetic field $B_u=\hat{B}(0, \sin(k_u z), 0)$ with an undulator period $\lambda_u$ and a wavenumber $k_u=2\pi/\lambda_u$, the relativistic electrons are forced onto a transverse sinusoidal trajectory by the magnetic field of the undulator. In this case, the co-propagating electromagnetic wave is polarized in the plane of the electron deflection. The parameters of the undulator and electromagnetic wave or its harmonics are matched to the electron beam, such that the resonance condition $$\lambda_l = \frac{\lambda_u}{2n\gamma^2}\left(1 + \frac{K_x^2}{2} + \frac{K_y^2}{2} + \frac{a_l^2}{2}\gamma^2\theta_x^2 + \gamma^2\theta_z^2\right) \tag{1}$$

is fulfilled, where $\lambda_l$ is the wavelength of the electromagnetic wave, $\lambda_u$ the undulator period, n the harmonic number, γ the electron beam energy normalized to the electron rest mass $mc^2$, $\theta_x$ and $\theta_y$ the electron beam divergence in x and y direction, respectively and the horizontal/vertical undulator deflection parameter $K_{x,y}=e\hat{B}_{x,y}\lambda_u/(2\pi mc^2)=0.0934\ \hat{B}_{x,y}[T]\ \lambda_u\ [mm]$ with the undulator peak magnetic field $\hat{B}_{x,y}$ and the normalized laser field $a_l=eE_l\lambda_l/(2\pi mc^2)\approx\lambda_l\ [\mu m]\sqrt{I_l[W/cm^2]/1.4\times10^{18}}$.

In a process called inverse free-electron laser (iFEL)[1,2], the interaction of the electromagnetic wave with the electron bunch inside the undulator leads to a sinusoidal longitudinal energy modulation Δγ of the electron bunch (see FIG. 2, panels b-e, first row). The magnitude of the relative energy modulation $\Delta\gamma/\gamma$ is approximately given by[2]

$$\frac{\Delta\gamma}{\gamma} \approx \frac{a_l K}{\lambda_l \gamma^2} = [J_0(G) - J_1(G)]L_u, \tag{2}$$

with the laser wavenumber $k_l=2\pi/\lambda_l$, the undulator length $L_u$, $J_n$ are Bessel functions of the first kind and $G=k_lK/8\ k_u\gamma^2 \simeq K^2/4(1+K^2/2)$.

The longitudinally modulated electron momentum distribution is given by $$p(s) = p_0 + A\sin(k_l s), \tag{3}$$

where s is the longitudinal electron bunch coordinate, $p_0$ the average initial momentum, $k_l$ the laser wavenumber and $A=\Delta\gamma/\sigma_\gamma$ is the energy modulation $\Delta\gamma$ amplitude normalized to the initial electron bunch RMS energy spread $\sigma_\gamma$ (see FIG. 2, panels b-e, first row).

This energy modulation is converted into a longitudinal density modulation using a dispersive element for the electron beam energy, such as the undulator or a separate magnetic chicane (see FIG. 2, panels b-e, $2^{nd}$ and $3^{rd}$ row). Importantly, the longitudinal charge distribution has periodic density spikes (microbunches) that are spatially separated by $\lambda_l$. The longitudinal length of each density spike is approximately for a large relative energy-modulation amplitude A is approximately given by[3]

$$\sigma_s \approx \frac{\lambda_l}{2A}. \tag{4}$$

Microbunches with a very short duration can be generated using a large A. These microbunches can generate high-power coherent radiation for a wavelength that is longer than the microbunch duration (see below), even with electron beam energies that is much lower than those conventionally used for example in soft X-ray or hard X-ray FELs.

In one example, an electron bunch with an energy of about 100 MeV ($\gamma\approx200$) and a small initial RMS slice energy spread of $$\frac{\sigma_\gamma}{\gamma} = 2.5\times10^{-5}$$

is used. The electron bunch interacts with a modulation laser pulse with a wavelength $\lambda_l$=266 nm, 4 mJ pulse energy, 100 fs pulse duration, focused to a spot size of 130 µm. The laser and electron bunch interact in a 3-period undulator with period $\lambda_u$=1.1 cm and magnetic field $B_u$=1.25 T, tuned such that the laser and the electron bunch are resonant according to equation (1). To match the energy-acceptance of the undulator, which is given by $\Delta\gamma/\gamma=\frac{1}{2}\ \Delta\lambda_u/\lambda_u=1/nN$, where Nis the number of undulator periods, to allow a large energy modulation, an undulator with only a few periods may be used. These interaction leads to an electron beam with a longitudinally modulated momentum with $A\approx1{,}600$. As there is nearly no net energy transfer from the incoming radiation pulse to the electron bunch, the modulator laser pulses can be generated by fresh laser pulses for each repetition or can be provided through recycling the previous laser pulse in a laser cavity that can be an enhancement cavity.

The interaction may be calculated using a particle-tracking simulation, such as the general particle tracer (GPT). With these parameters, the simulations lead to microbunches, each with an RMS length of $\sigma_s$=0.5 nm and a captured charge of 1.5 pC, which is about 50% of the charge. Ultimately, the charge in the microbunches and their duration is limited by space charge repulsion between the electrons, which is implemented in the simulations. In this scheme the radiation is generated during this process, inside the undulator where the space charge repulsion is suppressed compared to a free drift of the electron bunch. Space charge forces are suppressed at higher electron energies due to relativistic effects.

The conversion efficiency from the electron bunch power to radiation power can be increased by increasing the fraction of captured electrons. This can be achieved in an embodiment using a pre-bunched electron beam or through a double buncher including the use of laser harmonics and coupling harmonic coupling to the electron bunch through the harmonic factor n in equation (1).

Generation of Coherent Radiation

Electron bunches can generate intense coherent radiation when the bunch length $\sigma_s$ is shorter than the wavelength of the generated radiation $\lambda_r$, specifically if the condition[4]

$$\sigma_s < \frac{\lambda_r}{2} \tag{5}$$

is fulfilled.

The intensity of coherent emission scales quadratically with the number of electrons in the bunch $N_e$, whereas in case of incoherent emission the intensity only scales linearly with $N_e$. This quadratic scaling leads to a significant increase in the emitted radiation power compared to the incoherent case. The radiation can be generated through spontaneous (superradiant) coherent emission or stimulated coherent emission, which includes but is not limited to coherent synchrotron radiation, coherent undulator radiation, inverse Compton scattering, Thomson scattering, transition radiation, diffraction radiation or Smith-Purcell radiation.

In one embodiment, coherent inverse Compton scattering is used, which can be thought of as coherent undulator radiation with an electromagnetic undulator (laser wiggler) as shown in FIG. 1. In this embodiment a laser pulse interacts with the micro-bunched electron pulse. Due to the dispersion of the electron bunch and space charge repulsion, which results in an increase of the microbunch lengths, the radiation emission occurs inside the undulator that is used to induce the microbunching while the bunch has the shortest micro-bunch length (see FIG. 1). For relativistic electrons, the wavelength that is generated by the electromagnetic undulator is given by $$\lambda_r = \lambda_{las}\left(\frac{1 + \frac{a_l^2}{2} + \gamma^2\theta^2}{2\gamma^2(1-\cos\phi)}\right) \tag{6}$$

where $\lambda_{las}$ is the wavelength of the electromagnetic undulator, $a_l$ the normalized field as defined above, $\theta$ the emission angle of the generated radiation and $\phi$ the interaction angle between the electron bunch and the electromagnetic undulator where $\phi$=1800 corresponds to a head-on collision (see FIG. 1). The wavelength of the electromagnetic undulator can be tuned by the laser wavelength, the electron energy and the interaction angle $\phi$.

In one example embodiment, an electromagnetic undulator is used, which is generated by an 800 nm laser pulse with a normalized field of $a_l$=0.5 interacting with the electron beam with an angle of $\phi$=4.570 (nearly colinear), for a resonant wavelength of $\lambda_r$=3.5 nm. The coherent emission may be simulated using the synchrotron radiation calculation code SPECTRA[5]. For the radiation calculation only one microbunch with a charge of 1.5 pC and an RMS bunch length of $\sigma_s$=0.5 nm and a relative energy spread of 10% is simulated (see FIG. 3).

The simulation of one microbunch shows a strong emission of approximately $9\times10^8$ photons/microbunch/0.1% bandwidth at a photon energy of 307 eV. This is equivalent to a pulse energy 8.8 μJ per 1.5 pC microbunch in a 20% bandwidth. Considering approximately 50% of the charge being trapped in a microbunch and assuming a total bunch charge of 210 pC, this result in an emitted pulse energy of 616 μJ/pulse. For an operation at a 1 MHz repetition rate, this leads to an average power of 616 W.

As can be seen, in an embodiment, the wavelength of the emitted radiation is a factor of approximately 100 smaller than that of the radiation pulse causing the microbunching.

FIG. 3 shows the spectrum of coherent radiation emission of one microbunch simulated using the SPECTRA simulation using the parameters shown in Table 1.

TABLE 1

| Soft X-ray simulation case | |
|---|---|
| Electron microbunch | |
| Electron microbunch charge | 1.5 pC (50% charge trapped in microbunch) |
| Electron microbunch length, $\sigma_s$ | 0.5 nm |
| Radiated pulse energy per microbunch | 8.8 μJ in 20% bandwidth @ 4 nm central wavelength |
| Full electron bunch | |
| Total electron bunch charge | 210 pC (70 microbunches in full bunch) |
| Total electron bunch length | 62 fs (RMS) |
| Radiated pulse energy per bunch | 616 μJ in 20% bandwidth @ 4 nm central wavelength |
| Radiated pulse duration | 62 fs (RMS) |
| Radiation power | |
| Repetition rate | 1 MHz |
| Average power | 616 W |
| Electron-to-radiation power conversion efficiency | 3% |

In an embodiment, this approach can be cascaded to generate even shorter, hard X-ray wavelengths. In this case the radiation emission of a first stage is overlapped either with the same or a fresh electron bunch in a second undulator that is tuned to the corresponding resonance condition. This causes microbunching on a shorter scale and the emission of coherent radiation at a shorter wavelength.

REFERENCES

1. Palmer, R. B. Interaction of Relativistic Particles and Free Electromagnetic Waves in the Presence of a Static Helical Magnet. J. Appl. Phys. 43, 3014-3023 (1972).
2. Courant, E. D., Pellegrini, C. & Zakowicz, W. High-energy inverse free-electron laser accelerator. AIP Conf. Proc. 127, 849-874 (1985).
3. Hemsing, E., Stupakov, G., Xiang, D. & Zholents, A. Beam by design: Laser manipulation of electrons in modern accelerators. Rev. Mod. Phys. 86, 897-941 (2014).
4. Gover, A. et al. Superradiant and stimulated-superradiant emission of bunched electron beams. Rev. Mod. Phys. 91, 35003 (2019).
5. Tanaka, T. & Kitamura, H. {\it SPECTRA}: a synchrotron radiation calculation code. J. Synchrotron Radiat. 8, 1221-1228 (2001).
6. Liu, Y. et al. Experimental Observation of Femtosecond Electron Beam Microbunching by Inverse Free-Electron-Laser Acceleration. Phys. Rev. Lett. 80, 4418-4421 (1998).
7. Geloni, G., Kocharyan, V. & Saldin, E. A novel self-seeding scheme for hard X-ray FELs. J. Mod. Opt. 58, 1391-1403 (2011).
8. Yu, L. H. Generation of intense uv radiation by subharmonically seeded single-pass free-electron lasers. Phys. Rev. A 44, 5178-5193 (1991).
9. Girard, B. et al. Optical Frequency Multiplication by an Optical Klystron. Phys. Rev. Lett. 53, 2405-2408 (1984).
10. Mirian, N. S. et al. Generation and measurement of intense few-femtosecond superradiant extreme-ultraviolet free-electron laser pulses. Nat. Photonics 15, 523-529 (2021).
11. Xiang, D. & Stupakov, G. Echo-enabled harmonic generation free electron laser. Phys. Rev. ST Accel. Beams 12, 30702 (2009).
12. Gadjev, I. et al. An inverse free electron laser acceleration-driven Compton scattering X-ray source. Sci. Rep. 9, 532 (2019).

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the disclosed subject matter (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., “such as”) provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A coherent light source device, comprising:

a magnetic or electromagnetic undulator structure configured to produce a linearly or helically polarized magnetic or electromagnetic field having three or more alternating periods of the magnetic or electromagnetic undulator structure and defining an axis within an interaction region;

a modulation laser source configured to emit one or multiple pulses of linearly or circularly polarized electromagnetic radiation that co-propagate with an electron beam bunch along the axis of the magnetic or electromagnetic undulator within the interaction region;

an electron beam source configured to generate the electron beam bunch that traverses the interaction region of the magnetic or electromagnetic undulator along the axis, wherein interaction of the electron beam bunch with the electromagnetic field of the one or multiple pulses of the modulation laser source in the interaction region of the magnetic or electromagnetic undulator structure induces the formation of electron microbunches within the electron beam bunch; and an undulation laser source configured to emit one or multiple pulses of electromagnetic undulation radiation that traverse the interaction region of the magnetic or electromagnetic undulator structure at an interaction angle with respect to the axis, or a second magnetic undulator, or a dielectric discontinuity, wherein interaction of the electron microbunches with the one or multiple pulses of electromagnetic undulation radiation or the second magnetic undulator or the dielectric discontinuity induces spontaneous or stimulated coherent emission of radiation by the electron microbunches at an emission wavelength, wherein the emission wavelength is shorter than a wavelength of the one or multiple pulses of electromagnetic undulation radiation or is shorter than the period of the second magnetic undulator or is shorter than the thickness of the dielectric discontinuity, wherein interaction of the one or more pulses of linearly or circularly polarized electromagnetic radiation with the electron beam bunch inside the linearly or helically polarized magnetic or electromagnetic undulator structure leads to a longitudinally modulated or micro bunched density of the electron beam density of the electron beam bunch with density spikes that have a length below a wavelength of the one or multiple pulses of electromagnetic radiation when the resonance condition given by the equation:

$$\lambda_l = \frac{\lambda_u}{2n\gamma^2}\left(1 + \frac{K_x^2}{2} + \frac{K_y^2}{2} + \frac{a_l^2}{2}\gamma^2\theta_x^2 + \gamma^2\theta_z^2\right)$$

is fulfilled, where $\lambda_l$ is the wavelength of the modulation laser source, $\lambda_u$ the undulator period of the magnetic or electromagnetic undulator structure, n the harmonic number, $\gamma$ the electron beam bunch energy normalized to the electron rest mass, $a_l$ the normalized laser field, $\theta_x$ and $\theta_y$ the electron beam bunch divergence in x and y directions, respectively, and the horizontal/vertical undulator deflection parameter $K_{x,y}$=0.0934 $\hat{B}_{x,y}$ [T] $\lambda_u$ [mm], where $\hat{B}_{x,y}$ is the undulator peak magnetic field.

2. The coherent light source device of claim 1, wherein the electron microbunches include electron bunches having a longitudinal charge distribution with periodic density spikes that are separated by a distance equal to the wavelength or harmonics of the wavelength of the one or multiple pulses of electromagnetic radiation emitted by the modulation laser source.

3. The coherent light source device of claim 1, wherein the one or multiple pulses of electromagnetic radiation are circularly polarized or polarized perpendicular to or in a plane of electron deflection of electrons in the electron beam bunch within the interaction region.

4. A coherent light source device of claim 1, wherein the emission wavelength $\lambda_r$ is given by the equation:

$$\lambda_r = \lambda_{las}\left(\frac{1 + \frac{a_l^2}{2} + \gamma^2\theta^2}{2\gamma^2(1 - \cos\phi)}\right),$$

where $\lambda_{las}$ is the wavelength of the one or multiple pulses of electromagnetic undulation radiation, $a_l$ is the normalized field of the modulation laser source, $\theta$ is the emission angle of the radiation generated by the electron beam bunch, $\phi$ the interaction angle between the electron beam bunch and the electromagnetic undulation radiation, and $\gamma$ is the energy of the electron beam bunch normalized to the electron rest mass $mc^2$.

5. The coherent light source device of claim 1, wherein the emission wavelength $\lambda_r$ is given by the equation:

$$\lambda_r = \frac{\lambda_u}{2n\gamma^2}\left(1 + \frac{K_x^2}{2} + \frac{K_y^2}{2} + \gamma^2\theta^2\right),$$

where $\lambda_u$ is the undulator period of the magnetic or electromagnetic undulator structure, n the harmonic number, $\gamma$ the electron beam bunch energy normalized to the electron rest mass $mc^2$, $\theta$ the angle of the radiation generated by the electron beam bunch, and $$K_{x,y} = \frac{e\hat{B}_{x,y}\lambda_u}{2\pi \mathrm{mc}^2}$$

is a horizontal/vertical undulator deflection parameter with the undulator peak magnetic field $B_{x,y}$.

6. The coherent light source device of claim 1, wherein propagation of the electron microbunches through or near a single or periodic dielectric discontinuity leads to the emission of coherent radiation.

7. The coherent light source device of claim 1, wherein the electron beam source includes electron optics components configured to steer or guide the electron beam bunch to traverse the interaction region of the electromagnetic undulator along the axis, and wherein the modulation laser source, the undulation laser source, the second magnetic undulator and the dielectric discontinuity each include optical components configured to condition and/or direct emitted radiation.

8. The coherent light source device of claim 1, wherein the one or multiple pulses of linearly or circularly polarized electromagnetic radiation have a pulse duration of between 1 fs-100 ps and a wavelength of between 100-3,000 nm and an intensity of 1-1,000 TW/cm$^2$, wherein when the undulation laser source is present, the one or multiple pulses of electromagnetic undulation radiation have a pulse duration of between 1 fs-100 ps and a wavelength of between 100-3,000 nm and an intensity of $1\times10^{15}$-$1\times10^{20}$ W/cm$^2$, wherein the electron beam bunch has an energy of between 50-1,000 MeV, wherein the three or more alternating periods of the magnetic or electromagnetic undulator structure have a period of 0.1-50 cm, and wherein when the dielectric discontinuity is present, the dielectric discontinuity has a thickness of 50 nm-100 pm or a periodic discontinuity with a period of 1-500 pm.

9. A method of generating coherent light, the method comprising:

generating an electron beam bunch that traverses an axis in an interaction region of a magnetic or electromagnetic undulator that produces a magnetic or electromagnetic field having three or more alternating periods along the axis within the interaction region, wherein interaction of the electron beam bunch with an additional electromagnetic field induces the formation of electron microbunches within the electron beam bunch;

generating one or multiple pulses of linearly or circularly polarized electromagnetic radiation that co-propagate with the electron beam bunch along the axis of the electromagnetic undulator within the magnetic or electromagnetic undulator; and generating one or multiple pulses of electromagnetic undulation radiation that traverse the interaction region of the magnetic or electromagnetic undulator at a first interaction angle with respect to the axis, wherein interaction of the one or multiple pulses of electromagnetic undulation radiation with the electron microbunches induces stimulated coherent emission of radiation by the electron microbunches at an emission wavelength that is shorter than a wavelength of the one or more or multiple pulses of electromagnetic undulation radiation, or providing a magnetic undulator, wherein interaction of the magnetic undulator with the electron microbunches induces stimulated coherent emission of radiation by the electron microbunches at an emission wavelength that is shorter than the period of the magnetic undulator, or providing a single or periodic dielectric discontinuity, wherein interaction of the electron microbunches with the dielectric discontinuity induces coherent emission of radiation by the electron microbunches at an emission wavelength that is shorter than the width of the periodic structure, wherein interaction of the one or more pulses of linearly or circularly polarized electromagnetic radiation with the electron beam bunch inside the magnetic or electromagnetic undulator leads to a longitudinally modulated or micro bunched density of the electron beam density of the electron beam bunch with density spikes that have a length below a wavelength of the one or multiple pulses of electromagnetic radiation when the resonance condition given by the equation:

$$\lambda_l = \frac{\lambda_u}{2n\gamma^2}\left(1 + \frac{K_x^2}{2} + \frac{K_y^2}{2} + \frac{a_l^2}{2}\gamma^2\theta_x^2 + \gamma^2\theta_z^2\right)$$

is fulfilled, where $\lambda_l$ is the wavelength of the modulation laser source, $\lambda_u$ the undulator period of the magnetic or electromagnetic undulator, n the harmonic number, $\gamma$ the electron beam bunch energy normalized to the electron rest mass, $a_l$ the normalized laser field, $\theta_x$ and $\theta_y$ the electron beam bunch divergence in x and y directions, respectively, and the horizontal/vertical undulator deflection parameter $K_{x,y}=0.0934\,\hat{B}_{x,y}$ [T] $\lambda_u$ [mm], where $\hat{B}_{x,y}$ is the undulator peak magnetic field.

10. The method of claim 9, wherein the electron microbunches include electron bunches having a longitudinal charge distribution with periodic density spikes that are separated by a distance equal to the wavelength of the one or multiple pulses of electromagnetic radiation.

11. The method of claim 9, wherein the one or multiple pulses of electromagnetic radiation are circularly polarized or polarized perpendicular to or in a plane of electron deflection of electrons in the electron beam bunch within the interaction region.

12. The method of claim 9, wherein the emission wavelength $\lambda_r$ is given by the equation:

$$\lambda_r = \lambda_{las}\left(\frac{1 + \frac{a_l^2}{2} + \gamma^2\theta^2}{2\gamma^2(1 - \cos\phi)}\right),$$

where $\lambda_{las}$ is the wavelength of the one or multiple pulses of electromagnetic undulation radiation, $a_l$ is the normalized field of the generated electromagnetic radiation, $\theta$ is the emission angle of the radiation generated by the electron beam bunch, $\phi$ the first interaction angle between the electron beam bunch and the electromagnetic undulation radiation, and $\gamma$ is the energy of the electron beam bunch normalized to the electron rest mass mc$^2$.

13. The method of claim 9, wherein the emission wavelength $\lambda_r$ is given by the equation:

$$\lambda_r = \frac{\lambda_u}{2n\gamma^2}\left(1 + \frac{K_x^2}{2} + \frac{K_y^2}{2} + \gamma^2\theta^2\right),$$

where $\lambda_u$ is the undulator period of the magnetic or electromagnetic undulator, n the harmonic number, $\gamma$ the electron beam bunch energy normalized to the electron rest mass mc$^2$, $\theta$ the angle of the emitted radiation, and $K_{x,y}=e\hat{B}_{x,y}\lambda_u/(2\pi mc^2)$ is a horizontal/vertical undulator deflection parameter with the undulator peak magnetic field $\hat{B}_{x,y}$.

14. The method of claim 9, wherein propagation of the electron microbunches through or near a single or periodic dielectric discontinuity leads to the emission of coherent radiation.

15. The method of claim 9, further including steering or guiding the electron beam bunch to traverse the interaction region of the magnetic or electromagnetic undulator along the axis.

16. The method of claim 9, wherein the one or multiple pulses of linearly or circularly polarized electromagnetic radiation have a pulse duration of between 1 fs-100 ps and a wavelength of between 100-3,000 nm and an intensity of 1-1,000 TW/cm$^2$, wherein when the one or multiple pulses of electromagnetic undulation radiation is present, the one or multiple pulses of electromagnetic undulation radiation have a pulse duration of between 1 fs-100 ps and a wavelength of between 100-3,000 nm and an intensity of $1\times10^{15}$-$1\times10^{20}$ W/cm$^2$, wherein the electron beam bunch has an energy of between 50-1,000 MeV, wherein the three or more alternating periods of the magnetic or electromagnetic undulator have a period of 0.1-50 cm, and wherein when the dielectric discontinuity is present, the dielectric discontinuity has a thickness of 50 nm-100 pm or a periodic discontinuity with a period of 1-500 pm.

* * * * *